July 5, 1927.
L. C. WEINBERG
FUEL HEATER
Filed Dec. 15, 1924
1,634,968
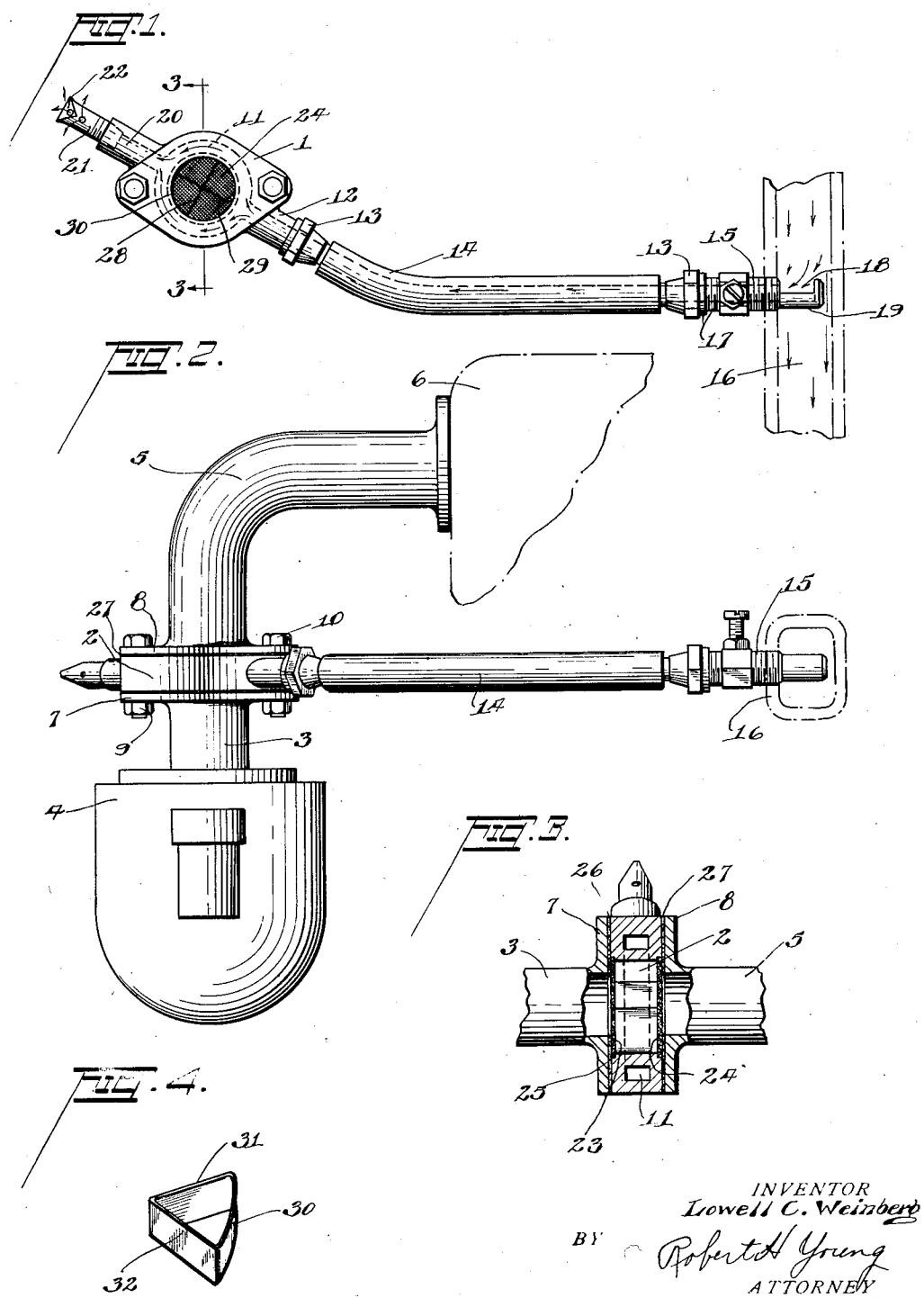
INVENTOR
Lowell C. Weinberg
BY Robert H. Young
ATTORNEY Patented July 5, 1927.

1,634,968

UNITED STATES PATENT OFFICE.

LOWELL C. WEINBERG, OF SEATTLE, WASHINGTON.

FUEL HEATER.

Application filed December 15, 1924. Serial No. 756,050.

This invention relates to a fuel heating apparatus for use in heating the fuel after it has been passed through the carburetor, and before it has been drawn into an internal combustion engine.

The main object of the invention is the provision of an integral casting provided with axial passage through which the fuel passes, and a surrounding chamber which is heated by the exhaust of the engine. A plurality of parallel wire screens are provided, one on each side of the casting, and the whole unit heat insulated from the parts to which it is attached by means of asbestos gaskets.

Further objects are more fully set forth in the attached specification, in the claim, and in the drawings, in which Fig. 1 is a plan view of my fuel heater as connected to a pipe leading to the exhaust manifold.

Fig. 2 is a side elevation of a fuel heater connected to a carburetor and to an intake manifold of the engine.

Fig. 3 is a vertical section on the line 3—3 of Fig. 1, and

Fig. 4 is a detail view of one of the sheet metal headers.

Referring more particularly to the drawings by reference numerals, the fuel heater designated generally 1, is constructed as an integral casting of aluminum, and is provided with an internal axial passage 2 as a cylinder through which the fuel passes as it travels from the fuel conduit 3, connected to the upper end of the carburetor 4. After the fuel has passed through the fuel heater it is passed through the upper fuel conduit 5, which is connected to the intake manifold of the engine. The two fuel conduits 3 and 5 are provided with flanges 7 and 8 respectively, and the fuel heater is held tightly between these two flanges by means of bolts 9 and 10 passing through bolt holes in the flanges and in the fuel heater.

The axial passage 2 is surrounded by a chamber 11 which is formed as a cored passage around the outside of the fuel heater. An inlet pipe 12 is cut integral with the casting, and is provided with an internal passage which communicates with the chamber 11. The inlet pipe 12 is adapted to be connected by means of a suitable connection 13 to a pipe 14 connected by a second connection 13 to an adapter 15, which is screwed into a tapped hole in the intake manifold 16.

The adapter 15 is provided with exterior threads 17, adapted to enter the threaded hole in the exhaust manifold. The end of the adapter is of generally cylindrical shape, but the forwardly pointing portion of this cylinder is provided with a cutaway part 18. The inwardly projecting rear part 19 of the adapter serves as a stop, against which the exhaust impinges and transmits part of the flow of the exhaust into the pipe 14 and to the heating chamber 11, by changing the direction of flow of this exhaust gas. The hot exhaust gases as they pass through the chamber 11 heat the entire casting before they are permitted to flow or escape through an outlet passage 20, the end of which is closed by a closer 21, with one or more very small holes 22.

The two ends of the axial opening 2 in the heat unit are covered by the two circular pieces of wire mesh screen of about 20 gauge designated 23 and 24. These two pieces are inserted in a small groove 25 in each of the sides of the casting, so as to be flush with the sides of the casting. Asbestos rings or gaskets 26 and 27 are provided to extend around and in contact with two faces of the casting, so as to prevent the loss of heat from this casting to the adjacent plates 3 and 5. The heat will thus be conserved in the casting so as to be entirely utilized and applied to the fuel by means of the two screens 26 and 27, and also by means of the segmental shaped strips of sheet metal 28 and 29, see Figs. 1 and 4. Each copper sheet is bent to extend about one-fourth the distance around the wall of the opening so as to be in contact therewith for the full extent of the part 30, as shown in Fig. 1. The two radially extending portions 31 and 32 are placed with their sides parallel to the flow of the fuel through the casting and form a means for conducting the heat from the outer walls of the opening to the intermediate portions of the opening. The two screens 23 and 24 are positioned horizontally, and when the engine is in use, serve to conduct the heat from the casting 1 and transmit it to the fuel as the fuel passes through the small holes in the screens. Due to the horizontal position of the screens these screens serve to collect and hold unvaporized fuel thereon, after the engine is stopped and after the heated fuel in the pipe conduit 5 is cooled and runs back to the screens. The screens also are quite effective in fully vaporizing the fuel. As the fuel passes through the lower screen 23 there is an instantaneous compression, and a subsequently instantaneous expansion of the fuel due to the smaller cross sectional area of the passage through the screen, and it is believed that this compression is effective in causing absorption of unvaporized fuel by the fuel mixture in the passage. This action is assisted by the heat applied to the fuel and to the fuel mixture as it comes in contact with the surface of the screens.

I claim:

In a device for vaporizing fuel for internal combustion engines, in combination, a cored aluminum casting having a cylindrical opening therethrough, a chamber in said casting surrounding and co-axial with said opening, a pipe connected to said chamber and adapted to be connected to the exhaust manifold of the engine, to conduct a part of the exhaust gases to said chamber, a flat wire screen covering each end of said opening, an asbestos gasket on each side of said casting to heat insulate the casting from fuel conduits to which it is connected, and a copper strip bent to extend substantially one-fourth of the distance around the wall of the opening in contact therewith and having parts thereof extending radially and parallel to the flow of the fuel through said opening.

In testimony whereof I affix my signature.

LOWELL C. WEINBERG.